(12) United States Patent
Flamang et al.

(10) Patent No.: US 7,214,157 B2
(45) Date of Patent: May 8, 2007

(54) GEAR UNIT LUBRICATION

(75) Inventors: Peter Flamang, Antwerp (BE); Warren Smook, Antwerp (ZA)

(73) Assignee: Hansen Transmissiosn International N.V., Antwerp (BE)

( * ) Notice: Subject to any disclaimer, the term of this patent is extended or adjusted under 35 U.S.C. 154(b) by 167 days.

(21) Appl. No.: 10/940,724

(22) Filed: Sep. 15, 2004

(65) Prior Publication Data

US 2005/0051387 A1  Mar. 10, 2005

Related U.S. Application Data

(63) Continuation-in-part of application No. PCT/IB03/01498, filed on Mar. 14, 2003.

(30) Foreign Application Priority Data

Mar. 15, 2002  (GB) ................... 0206163.8

(51) Int. Cl.
*F16H 57/04* (2006.01)
(52) U.S. Cl. .................. 475/159; 74/467; 184/6.12
(58) Field of Classification Search ............ 74/467, 74/468; 475/159; 384/474; 184/6.12, 6.17, 184/7.3

See application file for complete search history.

(56) References Cited

U.S. PATENT DOCUMENTS

| 3,960,029 | A | * | 6/1976 | Eichinger | ................. 74/413 |
|---|---|---|---|---|---|
| 4,131,169 | A | * | 12/1978 | Eickhoff et al. | ........... 180/9.62 |
| 5,472,383 | A | * | 12/1995 | McKibbin | .................. 475/159 |
| 5,643,127 | A | * | 7/1997 | Yoshii et al. | ............... 475/160 |
| 5,663,600 | A | | 9/1997 | Baek et al. | |
| 6,223,616 | B1 | | 5/2001 | Sheridan | |
| 6,561,945 | B2 | * | 5/2003 | Shattuck et al. | ............ 475/331 |
| 2003/0027680 | A1 | | 2/2003 | Wildeshaus | |

FOREIGN PATENT DOCUMENTS

| DE | 199 60 157 | 6/2001 |
|---|---|---|
| EP | 0 731 291 | 9/1996 |

\* cited by examiner

*Primary Examiner*—David D. Le
(74) *Attorney, Agent, or Firm*—Young & Thompson

(57) ABSTRACT

A gear unit includes a planet gear rotatable about a sun gear and supported by a planet carrier, the planet carrier including an annular formation for flow of lubricant and which is substantially concentric with the major axis about which the planet carrier is rotatable, and the gear unit including a housing having at least one lubricant supply position provided at a position radially aligned with the annular formation of the planet carrier as considered relative to the major axis about which the planet carrier rotates, and the planet carrier including flow paths for flow of lubricant from the annular formation to a planet gear bearing. The invention also discloses a method of lubricating a gear unit.

15 Claims, 4 Drawing Sheets

FIGURE. 5
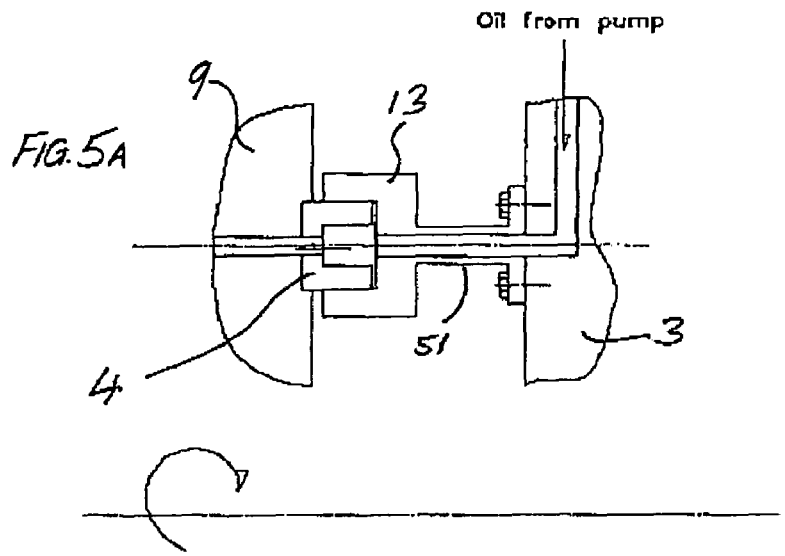
FIG. 5A
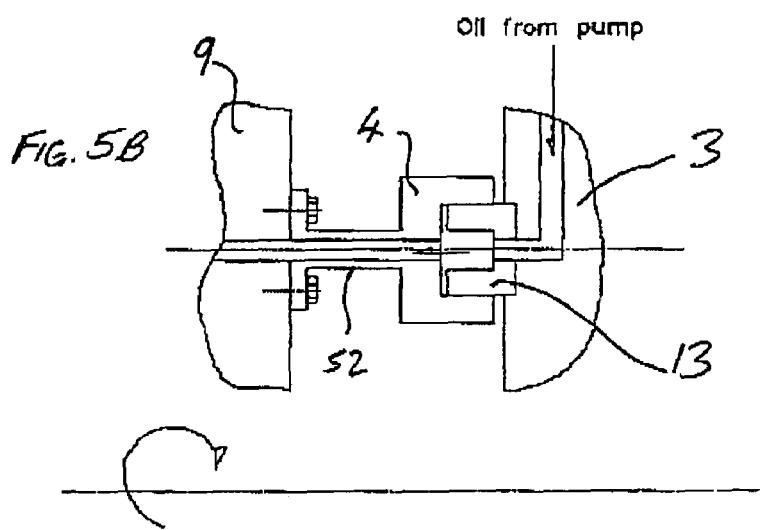
FIG. 5B
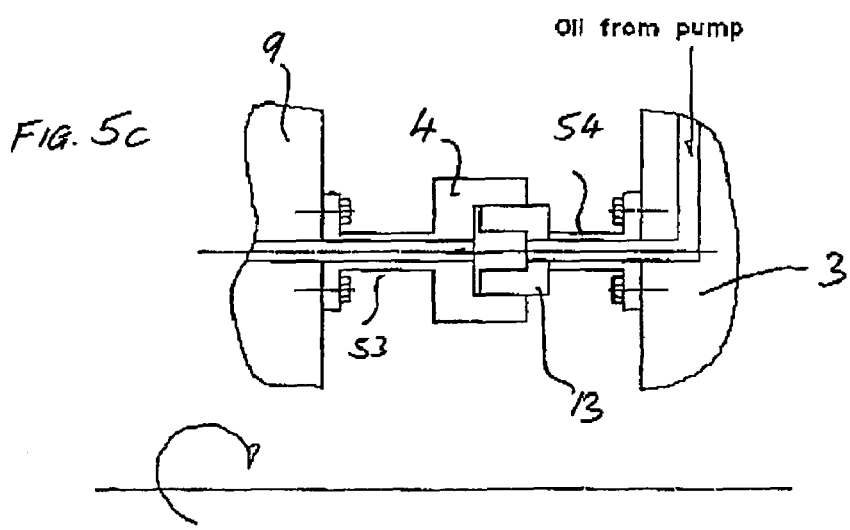
FIG. 5C

GEAR UNIT LUBRICATION

1. INTRODUCTION

To maximise the lifetime of bearings used to support planet gears (in planetary gear stages of gearboxes) it is advantageous to be able to deliver oil to the bearings in quantities that are required for the specific application. When oil is delivered to a lubricated element via a hole or tube with known geometry and if the oil-pressure and-temperature are known at a certain point in such a hole or tube, the exact quantity of oil delivered can be calculated. The quantity of oil delivered can thus be altered as a function of the pressure in the tube or hole.

Because of relative movement between the planet carrier and the housing of a gearbox, a method is needed to transfer oil from a stationary oil line to the rotating planet bearings whilst retaining a part of the pressure in the stationary oil line.

2. SUMMARY OF INVENTION

The present invention provides a method for supplying lubricant from a stationary lubricant supply to a rotating bearing of a planet gear, and a gear unit for use in accordance with the method of the invention.

In accordance with one of its aspect the present invention provides a gear unit comprising a planet gear rotatable about a sun gear and supported by a planet carrier, said planet carrier comprising an annular formation for flow of lubricant and which is substantially concentric with the major axis about which the planet carrier is rotatable, and the gear unit comprising a housing having at least one lubricant supply position provided at a position radially aligned with said annular formation of the planet carrier as considered relative to said major axis about which the planet carrier rotates, and the planet carrier comprising flow paths for flow of lubricant from said annular formation to a planet gear bearing.

The annular formation may be circumferentially continuous or may comprise a plurality of circumferentially spaced positions at which the planet carrier is able to receive a flow of lubricant.

The housing may comprise a single lubricant supply position or, for example, a plurality of circumferentially spaced (preferably uniformly circumferentially spaced) supply positions. The or each lubricant supply position may direct lubricant into the annular formation either in a direction parallel with the aforementioned axis of rotation, or obliquely. In the case of an oblique direction of supply, preferably the lubricant has a circumferential component of flow direction which is in the same direction as the direction of rotation of the annular formation.

The housing may, comprise an annular formation which is aligned with the annular formation of the planet carrier, and lubricant may be supplied to said annular formation of the housing through one or a plurality of feed paths.

Preferably an annular formation of one of the planet carrier and housing extends, in said axial direction, into a recess to define by the annular formation of the other of the planet carrier and housing in a manner which provides a labyrinth type seal. Thus pressurised lubricant supplied from the housing may flow under pressure to a planet gear bearing with a pressure loss determined in part by the construction and tolerances of the labyrinth seal and without the need to provide a sliding seal between the planet carrier and gear unit housing. However, the present invention does not exclude the use of a seal which is supported by the planet carrier or housing and is in contact with the other of the planet carrier and housing to effect a seal therebetween.

In accordance with another aspect the invention provides a method of lubricating a gear unit comprising a planet gear supported by a planet carrier and rotatable about a sun gear and a ring gear held in a stationary housing comprising providing a lubricant supply channel through said stationary housing at a position radially aligned, as considered about the axis of rotation of the planet carrier, with a lubricant receiving formation provided on a confronting face of the planet carrier, providing a lubricant flow path from said receiving formation through said planet carrier into the vicinity of the planet gear shafts and thereafter pumping lubricant through the lubricant supply channel in the lubricant receiving formation and thence through the flow path through planet carrier.

Embodiments of the invention will now be described in more detail, by way of example only, with reference to the accompanying drawings in which:

FIGS. 5A, 5B and 5C show alternative implementations of the lubricant supply of FIG. 4.

Figure 1:
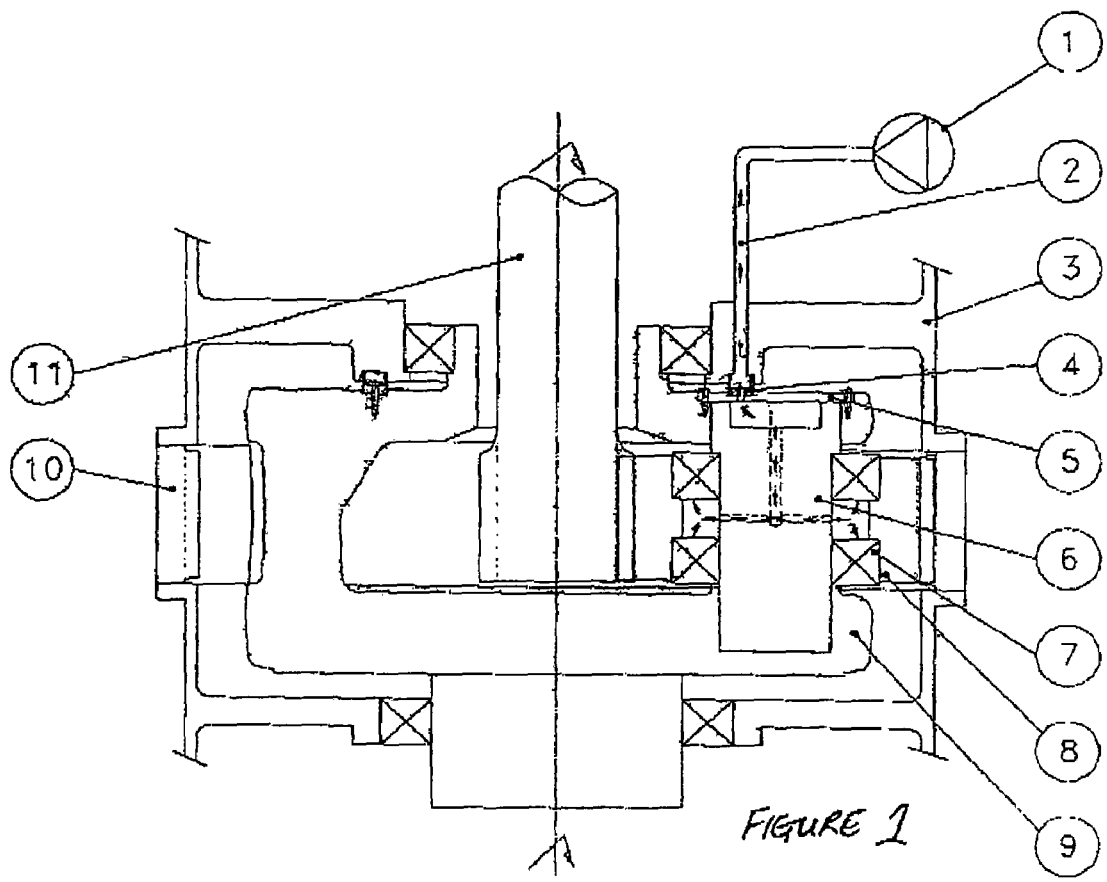
FIG. 1 is a schematic section diagram showing lubricant supply to a planetary gear stage in accordance with a first embodiment of the invention.

In the first embodiment of FIG. 1 a typical planetary stage of a gearbox is shown. In this case the planet carrier (9) rotates and the ring wheel (10) is stationary. The output of the planetary stage is via the sun (11). The planets (8) and planet bearings (7) are assembled on the planet shafts (6) that rotate together with the planet carrier.

A stationary pump (1) feeds oil through stationary oil lines and oil conditioning elements, (i.e. coolers, filters etc.) indicated in FIG. 1 as element (2).

A circular ring with a U-shaped profile (4) is assembled onto the back of the planet carrier. This ring fits into a machined ring groove in the stationary housing (3). Because the ring is fixed relatively to the rotating planet carrier, it consequently rotates relatively to the stationary housing. The combination of the U-shaped ring and the ring groove in the housing, forms a channel (18) through which oil can pass through holes in the lock plates (5) into cavities in the back of the planet shafts, (6). From here the oil moves through the holes in the planet shafts to the planet bearings, (7).

Figure 2:
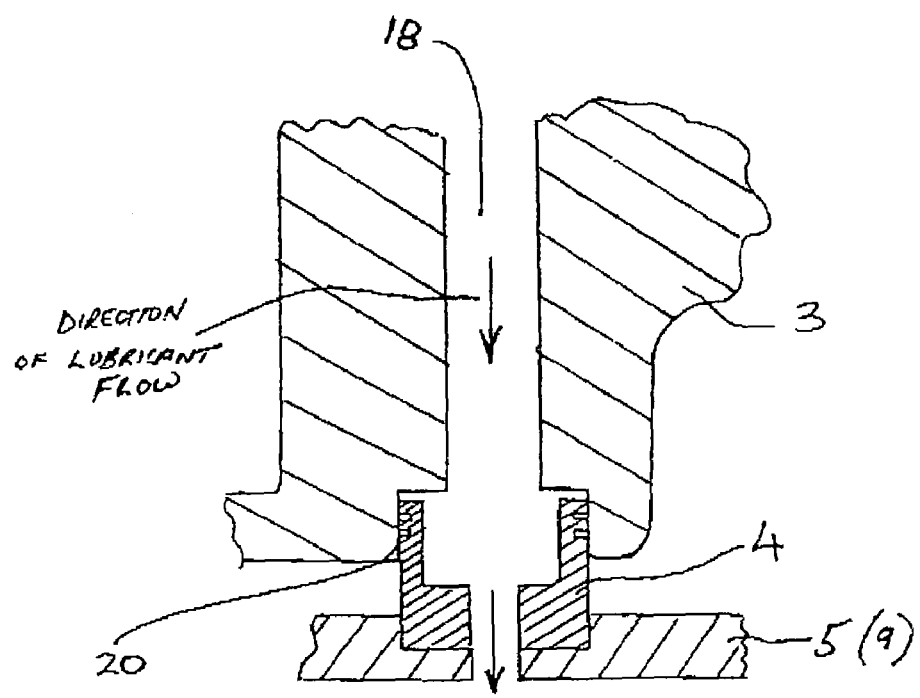
FIG. 2 is a schematic section drawing illustrating the labyrinth type seal formed between the circular ring with a U shaped profile and the machined ring groove in the stationary housing the first embodiment of FIG. 1.

Because of the fact that the U-shaped ring does not fit perfectly into the machined groove in the housing, there is a certain amount of oil leakage and pressure drop. The leakage rate, and pressure drop, is inversely proportional to the gap between the rotating elements in a labyrinth type seal (20) as shown in FIG. 2. The pressure remaining in the channel is available to drive the oil towards the planet bearings. This pressure in the channel can be determined experimentally.

For the practical implementation of this invention the U-shaped ring (4) can be manufactured in Polyamide. This material has superior wear resistance and remains flexible, even when in contact with common industrial gear oils at common operating temperatures. This would enable the use of small clearances between the stationary housing and U-shaped ring, assuring a minimum of leakage and pressure loss.

Figure 3:
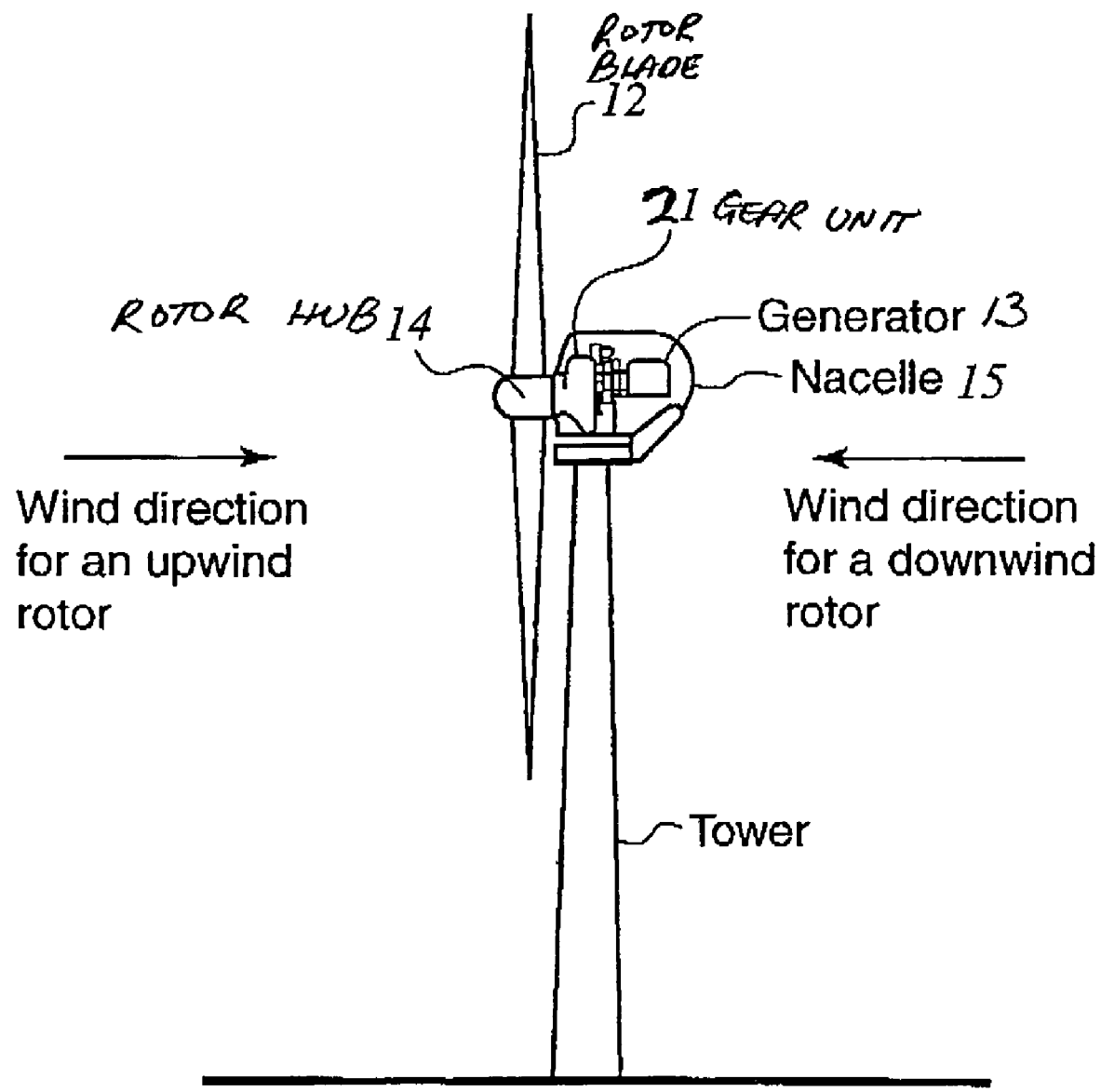
FIG. 3 is a schematic section drawing of a wind turbine generator comprising a gear unit employing the lubrication system and method of the present invention.

FIG. 3 shows a schematic section of a wind turbine incorporating a gear unit (21) having a lubricated planetary gear stage in accordance with the present invention.

In the above described first embodiment, relative radial movement between the stationary housing 3 and the rotating planet carrier 9 is accommodated by the compliancy of the U shaped ring 4 attached to the planet carrier. However the compliancy of the ring is limited since at higher internal oil pressures the flanks of the ring may be forced against the wall of the groove in the housing with consequently possible high wear rates. This means that in practice where the ring is made from a stiff polyamide and to ensure that the pressure build up is not excessive, the parts are machined to provide a clearance between the ring and the groove in the housing which consequently limits the operational pressures that may be obtained.

In some applications it may be particularly desired to employ high pressures or minimise the machinery tolerance requirements. That is addressed by the configuration shown in the second embodiment depicted in FIG. 4. This enables higher internal oil feed pressures to be employed without extra demands on machining tolerances.

Figure 4:
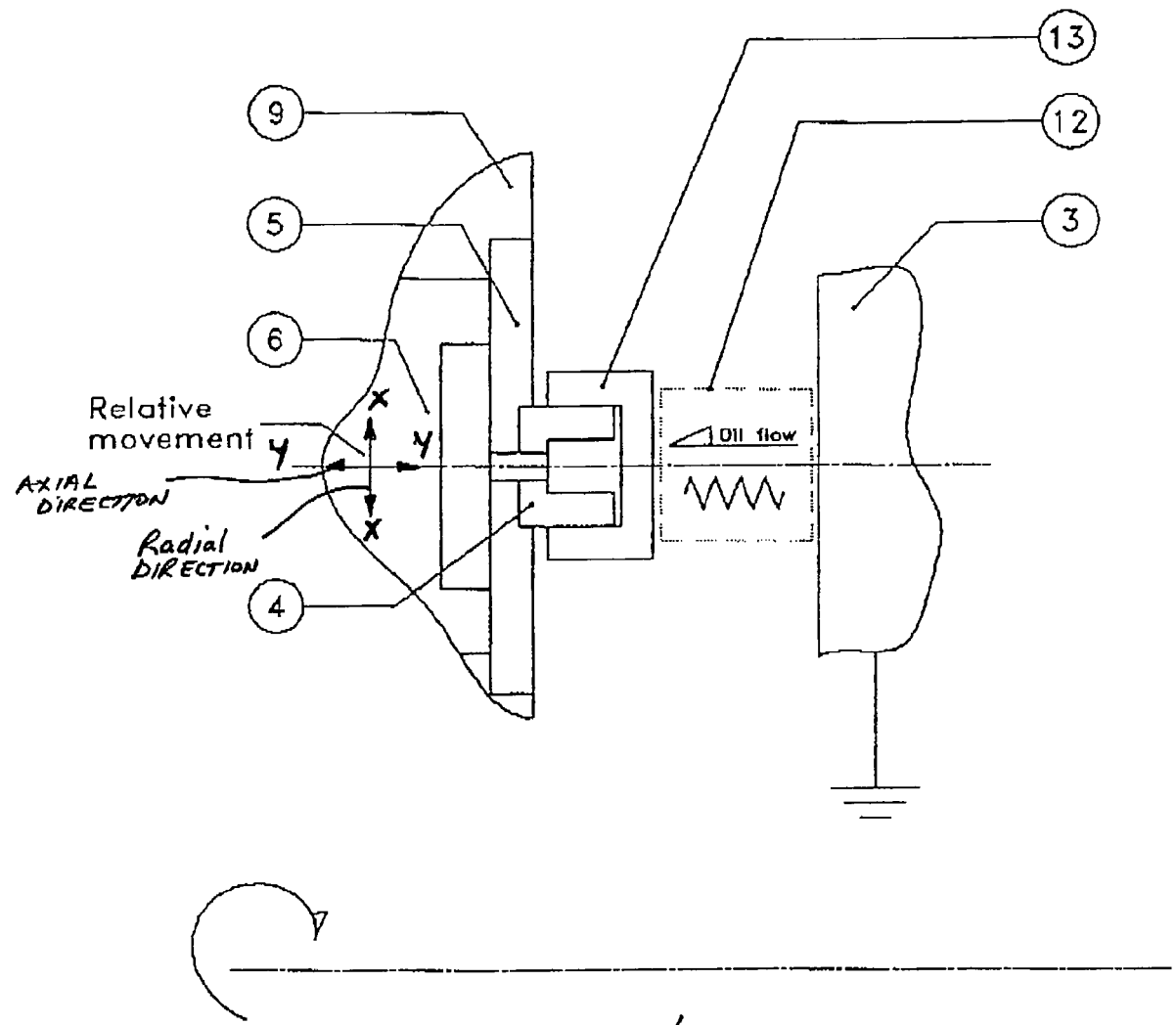
FIG. 4 is a schematic section drawing showing a lubricant supply according to a further embodiment of the invention.

In the second embodiment shown in FIG. 4 two new elements are introduced; another U shape ring 13 which engages with existing ring 4 and which is connected to the stationary housing via a hollow flexible element 12 providing an oil feed path. With the relative radial movement indicated by the arrows x-x in FIG. 4, between the planet carrier and stationary housing now being accommodated by a flexible element 12 and any axial movement in the direction y-y being accommodated by the small axial gap between the new U shaped elements 13 and the existing U shaped element 4, the two U shaped rings 4 and 13 can be constructed to be radially stiffer than previously and thus to have smaller clearances between them. Thus higher operational oil pressures may be obtained.

Shown in FIG. 5 are three variants by which the above described radial flexibility of the embodiment FIG. 4 may be obtained. In FIG. 5A the radial flexibility is provided by the stem 51 connecting U shaped ring 13 to the housing 3. Similarly FIG. 5B the radial flexibility is provided by the stem 52 connecting U shape ring 4 with the planet carrier 9. As shown in FIG. 5C the radial flexibility is provided by the combination of two stems 53, 54 respectfully connecting the U shape ring 4 with the planet carrier 9 and U shaped ring 13 with the housing 3.

As also shown in FIG. 5 it is envisaged that in accordance with the present invention the U shaped ring fixed in relation to the planet carrier may be an internal or external fit with the U shaped ring fixed with the housing 3.

The invention claimed is:

1. A gear unit comprising:
a planet gear rotatable about a sun gear and supported by a planet carrier,
said planet carrier comprising a first formation for a flow of a lubricant,
said first formation being substantially concentric with a major axis about which the planet carrier is rotatable, said planet carrier comprising a flow path for the flow of the lubricant from said first formation to a planet gear bearing, the gear unit comprising a housing having at least one lubricant supply at a position radially aligned with said first formation as considered relative to said major axis about which the planet carrier rotates, and
the housing comprises a second formation aligned with the first formation, the lubricant being supplied to said second formation of the housing,
wherein the first and second formations extend in an axial direction of said major axis and a circular ring secured to one of the housing and the planet carrier.

2. A gear unit according to claim 1, wherein the circular ring has a U shaped profile.

3. A gear unit according to claim 1, wherein the circular ring is connected to respectively one of the planet carrier and gear housing by an elongated hollow stem having an internal bore to provide an oil flow path.

4. A gear unit according to claim 1, wherein the circular ring is manufactured in a polyamide plastics material.

5. A gear unit according to claim 1, wherein each of the first and second formations comprise the circular ring so that there are two circular rings.

6. A gear unit according to claim 5, wherein at least one of the circular rings has a U shaped profile.

7. A gear unit according to claim 5, wherein at least one of the circular rings is connected to respectively one of the planet carrier and gear housing by an elongated hollow stem having an internal bore to provide an oil flow path.

8. A gear unit according to claim 5, wherein at least one of the circular rings is manufactured in a polyamide plastics material.

9. A gear unit, comprising:
a sun gear;
a stationary ring wheel;
a rotating planet carrier;
planets (8) and planet bearings (7) assembled on planet shafts (6) that rotate together with the planet carrier;
an oil feed pump (1);
a stationary housing (3) with a ring groove;
a circular ring with a U-shaped profile (4) assembled onto the back of the planet carrier, the ring fits into the ring groove, the circular ring fixed relatively to the rotating planet carrier and rotating relatively to the stationary housing, wherein,
a channel (18) formed by a combination of the circular ring and the ring groove, through the channel (18) oil from the oil feed pump passes into the back of the planet shafts (6) and to the planet bearings (7).

10. A gear unit, comprising:
a planet gear rotatable about a sun gear and supported by a planet carrier,
a gear housing, the housing comprising a ring groove,
a lubricant supply,
said planet carrier and the gear housing together providing a flow of a lubricant from the lubricant supply to a planet gear bearing, and
a circular ring assembled onto the back of the planet carrier, the ring fits into the ring groove, the circular ring fixed relatively to the rotating planet carrier and rotating relatively to the housing, wherein,
a channel is formed by a combination of the circular ring and the ring groove, through the channel (18) oil from the lubricant supply passes to the planet gear bearing.

11. A gear unit according to claim 10, wherein the circular ring has a U shaped profile.

12. A gear unit according to claim 10, wherein the gear unit comprises two circular rings.

13. A gear unit according to claim 12, wherein at least one of the circular rings has a U shaped profile.

14. A gear unit according to claim 12, wherein at least one of the circular rings is connected to respectively one of the planet carrier and gear housing by an elongated hollow stem having an internal bore to provide an oil flow path.

15. A gear unit according to claim 12, wherein at least one of the circular rings is manufactured in a polyamide plastics material.

* * * * *